US011312117B2

(12) United States Patent
Ayambem

(10) Patent No.: US 11,312,117 B2
(45) Date of Patent: *Apr. 26, 2022

(54) PHASE-CHANGE MATERIALS FROM WAX-BASED COLLOIDAL DISPERSIONS AND THEIR PROCESS OF MAKING

(71) Applicant: Henry Company, LLC, El Segundo, CA (US)

(72) Inventor: Amba Ayambem, Glenmoore, PA (US)

(73) Assignee: Henry Company, LLC, El Segundo, CA (US)

( * ) Notice: Subject to any disclaimer, the term of this patent is extended or adjusted under 35 U.S.C. 154(b) by 165 days.

This patent is subject to a terminal disclaimer.

(21) Appl. No.: 16/144,023

(22) Filed: Sep. 27, 2018

(65) Prior Publication Data

US 2019/0023959 A1 Jan. 24, 2019

Related U.S. Application Data

(62) Division of application No. 14/927,940, filed on Oct. 30, 2015, now Pat. No. 10,113,094.

(60) Provisional application No. 62/072,617, filed on Oct. 30, 2014.

(51) Int. Cl.
*C09K 5/06* (2006.01)
*E04C 2/04* (2006.01)
*B32B 27/20* (2006.01)

(52) U.S. Cl.
CPC ............. *B32B 27/20* (2013.01); *Y10T 428/25* (2015.01)

(58) Field of Classification Search
None
See application file for complete search history.

(56) References Cited

U.S. PATENT DOCUMENTS

| | | |
|---|---|---|
| 3,931,079 A | 1/1976 | Wise et al. |
| 3,982,993 A | 9/1976 | Fife |
| 3,998,944 A | 12/1976 | Long |
| 4,046,726 A | 9/1977 | Meiner et al. |
| 4,060,658 A | 11/1977 | Lin et al. |
| 4,117,199 A | 9/1978 | Gotoh et al. |
| 4,202,878 A | 5/1980 | Ritze |
| 4,263,362 A | 4/1981 | Straka |
| 4,289,671 A | 9/1981 | Hernandez |
| 4,325,852 A | 4/1982 | Hallenbeck |
| 4,329,265 A | 5/1982 | Hallenbeck |
| 4,339,276 A | 7/1982 | Yokoyama et al. |
| 4,348,234 A | 9/1982 | Cespon |
| T102,301 I4 | 10/1982 | Walker |
| 4,387,913 A | 6/1983 | Torii et al. |
| 4,405,746 A | 9/1983 | Girgis |
| 4,422,671 A | 12/1983 | Cespon |
| 4,434,208 A | 2/1984 | Girgis |
| 4,436,866 A | 3/1984 | Girgis |
| 4,439,556 A | 3/1984 | Girgis |
| 4,439,575 A | 3/1984 | Schwarz |
| 4,440,881 A | 4/1984 | Girgis |
| 4,468,254 A | 8/1984 | Yokoyama et al. |
| 4,470,855 A | 9/1984 | Bampfield |
| 4,518,652 A | 5/1985 | Willoughby |
| 4,533,567 A | 8/1985 | Marinelli |
| 4,537,914 A | 8/1985 | Smith et al. |
| 4,565,644 A | 1/1986 | Smith et al. |
| 4,576,987 A | 3/1986 | Crockatt et al. |
| 4,656,005 A | 4/1987 | Arpin |
| 4,693,909 A | 9/1987 | Ziegler et al. |
| 4,714,629 A | 12/1987 | Davis et al. |
| 4,750,933 A | 6/1988 | Brandstetter et al. |
| 4,919,841 A | 4/1990 | Kamel et al. |
| 4,956,233 A | 9/1990 | Chu et al. |
| 4,956,241 A | 9/1990 | Chu et al. |
| 5,049,186 A | 9/1991 | Kawabata |
| 5,085,695 A | 2/1992 | Randen et al. |
| 5,279,885 A | 1/1994 | Ohmori et al. |
| 5,306,488 A | 4/1994 | Vanlerberghe et al. |
| 5,358,554 A | 10/1994 | Seymour et al. |
| 5,431,840 A | 7/1995 | Soldanski et al. |
| 5,437,722 A | 8/1995 | Borenstein |
| 5,468,284 A | 11/1995 | Sturm |
| 5,482,550 A | 1/1996 | Strait |
| 5,723,137 A | 3/1998 | Wahle et al. |
| 5,798,136 A | 8/1998 | Landry-Coltrain et al. |
| 5,821,298 A | 10/1998 | Reynolds et al. |
| 5,902,846 A | 5/1999 | Feret et al. |
| 5,968,237 A | 10/1999 | Sinnige |
| 5,985,255 A | 11/1999 | Vanlerberghe et al. |
| 6,010,596 A | 1/2000 | Song |
| 6,033,736 A | 3/2000 | Perlman et al. |
| 6,066,201 A | 5/2000 | Wantling |
| 6,132,885 A | 10/2000 | Peek et al. |
| 6,153,347 A | 11/2000 | Kabai et al. |
| 6,562,876 B1 | 5/2003 | Ansmann et al. |
| 6,586,029 B1 | 7/2003 | Iverson et al. |
| 6,635,695 B2 | 10/2003 | Yoshida et al. |
| 6,663,707 B2 | 12/2003 | Wantling et al. |
| 6,746,977 B2 | 6/2004 | Schultz et al. |
| 6,857,224 B1 | 2/2005 | Kammereck et al. |
| 6,890,976 B2 | 5/2005 | Sinnige |

(Continued)

FOREIGN PATENT DOCUMENTS

WO  WO 2006/053405  5/2009

OTHER PUBLICATIONS

U.S. Appl. No. 61/914,850, filed Dec. 11, 2013, Ayambem.
U.S. Appl. No. 61/942,940, filed Feb. 21, 2014, Morrison.
U.S. Appl. No. 61/946,396, filed Feb. 28, 2014, Ayambem.

*Primary Examiner* — Cheng Yuan Huang
(74) *Attorney, Agent, or Firm* — BakerHostetler

(57) ABSTRACT

This invention generally relates to phase-change materials ("PCM" or "PCM materials") made from colloidally-protected wax-based microstructures. This invention also relates to such PCM materials configured in various physical forms. This invention further relates to a process of configuring such PCM materials for a variety of end-use applications in which dampening of temperature fluctuations by absorption and desorption of heat is desired. This invention further relates to preparing colloidally-protected wax-based microstructures in particulate form that function as PCM materials.

11 Claims, 5 Drawing Sheets

(56) References Cited

U.S. PATENT DOCUMENTS

| | | |
|---|---|---|
| 6,932,860 B1 | 8/2005 | Morton |
| 6,939,610 B1 | 9/2005 | Kaul |
| 6,953,500 B2 | 10/2005 | Lewis |
| 7,008,746 B2 | 3/2006 | Williams et al. |
| 7,015,442 B2 | 3/2006 | Tucker, Jr. et al. |
| 7,081,159 B2 | 7/2006 | Thames et al. |
| 7,118,785 B2 | 10/2006 | Rogmann et al. |
| 7,169,423 B2 | 1/2007 | Iverson et al. |
| 7,192,909 B2 | 3/2007 | Richter et al. |
| 7,222,455 B2 | 5/2007 | Schrader |
| 7,264,886 B2 | 9/2007 | Cui et al. |
| 7,267,743 B2 | 9/2007 | Borsinger et al. |
| 7,294,189 B2 | 11/2007 | Wantling |
| 7,300,547 B2 | 11/2007 | Luu et al. |
| 7,312,273 B1 | 12/2007 | Colby |
| 7,332,450 B2 | 2/2008 | Boylan |
| 7,358,022 B2 | 4/2008 | Farrugia et al. |
| 7,378,214 B2 | 5/2008 | Lee et al. |
| 7,396,395 B1 | 7/2008 | Chen et al. |
| 7,435,369 B2 | 10/2008 | Hennis et al. |
| 7,494,547 B2 | 2/2009 | Peterson et al. |
| 7,501,471 B2 | 3/2009 | Boylan |
| 7,524,536 B2 | 4/2009 | Myszak, Jr. |
| 7,531,022 B2 | 5/2009 | Quirmbach et al. |
| 7,553,363 B2 | 6/2009 | Dellinger et al. |
| 7,560,505 B2 | 7/2009 | Agur et al. |
| 7,682,434 B2 | 3/2010 | Akers, Jr. et al. |
| 7,696,270 B2 | 4/2010 | Lobo et al. |
| 7,771,763 B2 | 8/2010 | Iverson et al. |
| 7,776,928 B2 | 8/2010 | Borsinger et al. |
| 7,799,736 B2 | 9/2010 | Irita et al. |
| 7,811,413 B2 | 10/2010 | Hennis et al. |
| 7,842,731 B2 | 11/2010 | Eckert et al. |
| 7,846,296 B2 | 12/2010 | Luu et al. |
| 7,897,668 B2 | 3/2011 | Foerg et al. |
| 7,960,309 B2 | 6/2011 | Irita et al. |
| 7,994,251 B2 | 8/2011 | Rogmann et al. |
| 8,123,905 B2 | 2/2012 | Luu et al. |
| 8,202,363 B2 | 6/2012 | Wantling |
| 8,241,612 B2 | 8/2012 | Wrenn |
| 8,252,106 B2 | 8/2012 | Wantling |
| 8,357,318 B2 | 1/2013 | Guisinger |
| 8,382,888 B2 | 2/2013 | Dellinger et al. |
| 8,404,040 B2 | 3/2013 | Wantling |
| 8,424,243 B1 | 4/2013 | Narciso et al. |
| 8,476,345 B2 | 7/2013 | Buchholz |
| 8,486,377 B1 | 7/2013 | Wrenn |
| 8,541,350 B2 | 9/2013 | Kirsch et al. |
| 8,603,720 B2 | 12/2013 | Zhou et al. |
| 8,669,401 B2 | 3/2014 | Hassan et al. |
| 8,741,056 B2 | 6/2014 | Meyer et al. |
| 8,748,516 B2 | 6/2014 | Winterowd et al. |
| 9,670,097 B2 | 6/2017 | Ayambem |
| 2002/0143085 A1 | 10/2002 | Yoshida et al. |
| 2003/0075077 A1 | 4/2003 | Lewis |
| 2003/0129420 A1 | 7/2003 | Schultz et al. |
| 2003/0180647 A1 | 9/2003 | Patel et al. |
| 2003/0180649 A1 | 9/2003 | Patel et al. |
| 2003/0180650 A1 | 9/2003 | Patel et al. |
| 2003/0203084 A1 | 10/2003 | Iverson et al. |
| 2003/0219613 A1 | 11/2003 | Boylan |
| 2003/0232268 A1 | 12/2003 | Sacripante et al. |
| 2004/0011244 A1 | 1/2004 | Cui et al. |
| 2004/0018250 A1 | 1/2004 | Ceccoli et al. |
| 2004/0054067 A1 | 3/2004 | Rogmann et al. |
| 2004/0059038 A1 | 3/2004 | Williams et al. |
| 2004/0083928 A1 | 5/2004 | Shoshany |
| 2004/0102114 A1 | 5/2004 | Boylan |
| 2004/0146617 A1 | 7/2004 | Schrader |
| 2004/0146797 A1 | 7/2004 | Patel et al. |
| 2004/0157962 A1 | 8/2004 | Sinnige |
| 2004/0202950 A1 | 10/2004 | Ahuja et al. |
| 2004/0202951 A1 | 10/2004 | Nguyen et al. |
| 2004/0202952 A1 | 10/2004 | Albright et al. |
| 2004/0249052 A1 | 12/2004 | Kiriya et al. |
| 2004/0250969 A1 | 12/2004 | Luu et al. |
| 2004/0265728 A1 | 12/2004 | Patel et al. |
| 2004/0265729 A1 | 12/2004 | Patel |
| 2005/0089606 A1 | 4/2005 | Dellinger et al. |
| 2005/0113255 A1 | 5/2005 | Schrader et al. |
| 2005/0121131 A1 | 6/2005 | Hennis et al. |
| 2005/0132926 A1 | 6/2005 | Cui et al. |
| 2005/0136351 A1 | 6/2005 | Vandewinckel et al. |
| 2005/0136352 A1 | 6/2005 | Vandewinckel et al. |
| 2005/0175921 A1 | 8/2005 | Morris et al. |
| 2005/0176853 A1 | 8/2005 | Hopper et al. |
| 2005/0181294 A1 | 8/2005 | Hopper et al. |
| 2005/0184065 A1 | 8/2005 | Tucker et al. |
| 2005/0211405 A1 | 9/2005 | Yeh |
| 2005/0234156 A1 | 10/2005 | Thames et al. |
| 2005/0255402 A1 | 11/2005 | Hopper et al. |
| 2005/0271970 A1 | 12/2005 | Lee et al. |
| 2005/0272851 A1 | 12/2005 | Agur et al. |
| 2006/0003901 A1 | 1/2006 | Sohi |
| 2006/0009535 A1 | 1/2006 | Wantling |
| 2006/0011223 A1 | 1/2006 | Peterson et al. |
| 2006/0013792 A1 | 1/2006 | Fontaine et al. |
| 2006/0039933 A1 | 2/2006 | Cram et al. |
| 2006/0040194 A1 | 2/2006 | Sugiura et al. |
| 2006/0088782 A1 | 4/2006 | Lee |
| 2006/0091579 A1 | 5/2006 | Quirmbach et al. |
| 2006/0110498 A1 | 5/2006 | Dellinger et al. |
| 2006/0122313 A1 | 6/2006 | Boylan |
| 2006/0166121 A1 | 7/2006 | Patel et al. |
| 2006/0166122 A1 | 7/2006 | Patel et al. |
| 2006/0172220 A1 | 8/2006 | Patel et al. |
| 2006/0188551 A1 | 8/2006 | Hauser et al. |
| 2006/0196391 A1 | 9/2006 | Hassan et al. |
| 2006/0222990 A1 | 10/2006 | Farrugia et al. |
| 2006/0233866 A1 | 10/2006 | Hauser et al. |
| 2006/0264519 A1 | 11/2006 | Eckert et al. |
| 2006/0286391 A1 | 12/2006 | Myszak |
| 2006/0289138 A1 | 12/2006 | Borsinger et al. |
| 2007/0004846 A1 | 1/2007 | Rogmann et al. |
| 2007/0014903 A1 | 1/2007 | Iverson et al. |
| 2007/0048642 A1 | 3/2007 | Hsieh |
| 2007/0059509 A1 | 3/2007 | Racota |
| 2007/0068642 A1 | 3/2007 | Borsinger et al. |
| 2007/0071786 A1 | 3/2007 | Fisher |
| 2007/0122732 A1 | 5/2007 | Cheong et al. |
| 2007/0134583 A1 | 6/2007 | Cheong et al. |
| 2007/0181035 A1 | 8/2007 | Wantling et al. |
| 2007/0187647 A1 | 8/2007 | Bruckbauer |
| 2007/0190097 A1 | 8/2007 | Schrader |
| 2007/0213219 A1 | 9/2007 | Irita et al. |
| 2007/0213220 A1 | 9/2007 | Irita et al. |
| 2007/0264220 A1 | 11/2007 | Hiraishi et al. |
| 2007/0297992 A1 | 12/2007 | Schiemann et al. |
| 2007/0299191 A1 | 12/2007 | Lobo et al. |
| 2008/0005052 A1 | 1/2008 | Ali |
| 2008/0031905 A1 | 2/2008 | Cram et al. |
| 2008/0040882 A1 | 2/2008 | Duterme |
| 2008/0044644 A1 | 2/2008 | Luu et al. |
| 2008/0075507 A1 | 3/2008 | Anderson et al. |
| 2008/0107988 A1 | 5/2008 | Vandewinckel et al. |
| 2008/0112897 A1 | 5/2008 | Schiemann et al. |
| 2008/0112898 A1 | 5/2008 | Schiemann et al. |
| 2008/0171283 A1 | 7/2008 | Agur et al. |
| 2008/0187855 A1 | 8/2008 | Patel et al. |
| 2008/0227020 A1 | 9/2008 | Jones et al. |
| 2008/0317958 A1 | 12/2008 | Bhatt et al. |
| 2009/0025880 A1 | 1/2009 | Hennis et al. |
| 2009/0038507 A1 | 2/2009 | Akers, Jr. et al. |
| 2009/0071366 A1 | 3/2009 | Akers, Jr. et al. |
| 2009/0098079 A1 | 4/2009 | Schiemann et al. |
| 2009/0104314 A1 | 4/2009 | Dellinger et al. |
| 2009/0162774 A1 | 6/2009 | Morris et al. |
| 2009/0194004 A1 | 8/2009 | Meyer et al. |
| 2009/0227451 A1 | 9/2009 | Rose et al. |
| 2009/0235844 A1 | 9/2009 | Wantling |
| 2009/0235845 A1 | 9/2009 | Wantling |
| 2009/0255439 A1 | 10/2009 | Ichikawa |
| 2009/0263756 A1 | 10/2009 | Shoshany et al. |
| 2009/0269690 A1 | 10/2009 | Morris et al. |

(56) References Cited

U.S. PATENT DOCUMENTS

| | | |
|---|---|---|
| 2009/0286911 A1 | 11/2009 | Brick et al. |
| 2009/0322811 A1 | 12/2009 | Higgins |
| 2010/0010132 A1 | 1/2010 | Foerg et al. |
| 2010/0022697 A1 | 1/2010 | Rodriguez |
| 2010/0055591 A1 | 3/2010 | Chiu et al. |
| 2010/0062352 A1 | 3/2010 | Kusahara et al. |
| 2010/0062359 A1 | 3/2010 | Bensing et al. |
| 2010/0116406 A1 | 5/2010 | Mahoney et al. |
| 2010/0210491 A1 | 8/2010 | Piskoti |
| 2010/0239843 A1 | 9/2010 | Luu et al. |
| 2010/0249283 A1 | 9/2010 | Winterowd et al. |
| 2010/0285323 A1 | 11/2010 | Kirsch et al. |
| 2011/0005431 A1 | 1/2011 | Wantling |
| 2011/0048569 A1 | 3/2011 | Stuart et al. |
| 2011/0130457 A1 | 6/2011 | Borchman et al. |
| 2011/0200658 A1 | 8/2011 | Mulqueen |
| 2011/0207046 A1 | 8/2011 | Zhou et al. |
| 2011/0257301 A1 | 10/2011 | Stuart et al. |
| 2012/0003581 A1 | 1/2012 | Yang et al. |
| 2012/0039977 A1 | 2/2012 | Dracopoulos et al. |
| 2012/0114568 A1 | 5/2012 | Wrenn |
| 2012/0128950 A1 | 5/2012 | Kang |
| 2012/0138275 A1 | 6/2012 | Biggin et al. |
| 2012/0152148 A1 | 6/2012 | Dilley et al. |
| 2012/0156385 A1 | 6/2012 | Falkowski et al. |
| 2012/0189957 A1 | 7/2012 | Chiu et al. |
| 2012/0210910 A1 | 8/2012 | Wantling |
| 2012/0216722 A1 | 8/2012 | Stuart et al. |
| 2012/0231261 A1 | 9/2012 | Lender et al. |
| 2012/0263963 A1 | 10/2012 | Mahoney et al. |
| 2013/0035430 A1 | 2/2013 | Li et al. |
| 2013/0042792 A1 | 2/2013 | Stuart et al. |
| 2013/0108882 A1 | 5/2013 | Stuart et al. |
| 2013/0136855 A1 | 5/2013 | Subotic et al. |
| 2013/0136935 A1 | 5/2013 | Sedillo |
| 2013/0183533 A1 | 7/2013 | Wantling |
| 2013/0224395 A1 | 8/2013 | Regnier |
| 2013/0264513 A1 | 10/2013 | Yu et al. |
| 2013/0273472 A1 | 10/2013 | Park et al. |
| 2013/0305962 A1 | 11/2013 | Meyer et al. |
| 2013/0330526 A1 | 12/2013 | Song et al. |
| 2013/0344434 A1 | 12/2013 | Bensing et al. |
| 2014/0047998 A1 | 2/2014 | Wantling |
| 2014/0105845 A1 | 4/2014 | Bui et al. |
| 2014/0105945 A1 | 4/2014 | Bui et al. |
| 2014/0245928 A1 | 9/2014 | Meyer et al. |
| 2015/0158999 A1 | 6/2015 | Ayambem |

PHASE-CHANGE MATERIALS FROM WAX-BASED COLLOIDAL DISPERSIONS AND THEIR PROCESS OF MAKING

CROSS REFERENCE TO RELATED APPLICATIONS

The present application is a divisional of U.S. patent application Ser. No. 14/927,940, filed Oct. 30, 2015, now U.S. Pat. No. 10,113,094, which claims benefit of U.S. Provisional Patent Application No. 62/072,617, filed Oct. 30, 2014, both of which are incorporated herein by reference in their entireties.

FIELD

This invention generally relates to phase-change materials ("PCM" or "PCM materials") made from colloidally-protected wax-based microstructures. This invention also relates to such PCM materials configured in various physical forms. This invention further relates to a process of configuring such PCM materials for a variety of end-use applications in which dampening of temperature fluctuations by absorption and desorption of heat is desired. This invention further relates to preparing colloidally-protected wax-based microstructures in particulate form that function as PCM materials.

BACKGROUND

A phase-change material (PCM) is a substance with a high heat of fusion which, melting and solidifying at a certain temperature, is capable of storing and releasing large amounts of energy. Heat is absorbed or released when the material changes from solid to liquid and vice versa; thus, PCMs are classified as latent heat storage (LHS) units. The phase change herein would be the solid-liquid phase change. Depending on the molecular weight and the type of wax material used, one could tailor the phase change for various temperatures. U.S. Pat. No. 6,939,610 describes phase change materials. This patent is incorporated by reference as if fully set forth herein. PCMs take advantage of the latent heat that can be stored or released from a material over a narrow temperature range. PCMs possess the ability to change their state within a certain temperature range. These materials absorb energy during the heating process as phase change takes place and release energy to the environment in the phase change range during the reverse, the cooling process. Insulation effect reached by the PCM depends on temperature, time, and the type of material employed as phase change material.

Latent heat storage is one of the most efficient ways of storing thermal energy. Unlike the sensible heat storage method, the latent heat storage method provides much higher storage density, with a smaller temperature difference between storing and releasing heat. Every material absorbs heat during a hearing process while its temperature is rising constantly. The heat stored in the material is released into the environment through a reverse cooling process. During the cooling process, the material temperature decreases continuously. Comparing the heat absorption during the melting process of a phase change material with those in normal materials, much higher amount of heat is absorbed when a PCM melts. A paraffin-PCM, for an example, absorbs approximately 200 kJ/kg of heat if it undergoes a melting process. High amount of heat absorbed by the paraffin in the melting process is released into the surrounding area in a cooling process, which starts at the PCM's crystallization temperature.

During the complete melting process, the temperature of the PCM as well as its surrounding area remains substantially constant. The same is true for the crystallization process; during the entire crystallization process the temperature of the PCM does not change significantly either. The large heat transfer during the melting process as well as the crystallization process without significant temperature change makes PCM interesting as a source of heat storage material in practical applications. When temperature increases, the PCM microcapsules absorb heat and storing this energy in the liquefied phase change materials. When the temperature falls, the PCM microcapsules release this stored heat energy and consequently PCM solidify.

PCMs can be classified as three types: (1) organic phase change materials; (2) inorganic phase change materials; and (3) eutectic phase change materials. Organic PCMs are most often composed of organic materials such as paraffins, fatty acids, and sugar alcohols. For building applications, paraffinic PCMs are the most commonly used for several reasons. First, paraffinic PCMs are straight chain n-alkane hydrocarbon compounds such as n-heptadecane and n-eicosane. Their melting temperature and phase change enthalpy increase with the length of the carbon chain. When the number of carbon atoms in the paraffin molecule is between 13 and 28, the melting temperature falls within a range of approximately 23° to 140° F. (−5° to 60° C.), a temperature range that covers building applications in most climates around the world. In addition, paraffinic PCMs are chemically inert, nontoxic, reliable, and biocompatible. They also show a negligible subcooling effect. Fatty acids are represented by the chemical formula $CH_3(CH_2)_{2n}COOH$ (e.g., capric acid, lauric acid, and palmitic acid). Fatty acids have storage densities very similar to paraffins, and like paraffins their melting temperatures increase with the length of the molecule. Although chemically stable upon cycling, they tend to react with the environment because they are acidic in nature. Sugar alcohols are a hydrogenated form of a carbohydrate such as D-sorbitol or xylitol, among others. They generally have higher latent heat and density than paraffins and fatty acids. Because they melt at temperatures between 194° to 392° F. (90° and 200° C.), though, they are unsuitable for building applications.

These paraffin-based PCMs are made by physical microencapsulation of the paraffin core in a polymeric shell—these microcapsules which act as tiny containers of solids. Generally, microcapsules have walls less than 2 μm in thickness and 20-40 μm. The microcapsules are produced by depositing a thin polymer coating on core particles. The core contents—the active substance—may be released by friction, by pressure, by diffusion through the polymer wall, by dissolution of the polymer wall coating, or by biodegradation. For example, in their application in textiles, the paraffins are either in solid or liquid state. In order to prevent the paraffin's dissolution while in the liquid state, it is enclosed into small plastic spheres with diameters of only a few micrometers. These microscopic spheres containing PCM are called PCM-microcapsules.

Microcapsule production may be achieved by means of physical or chemical techniques. The use of some techniques has been limited to the high cost of processing, regulatory affairs, and the use of organic solvents, which are concern for health and the environment. Physical methods are mainly spray drying or centrifugal and fluidized bed processes which are inherently not capable of producing microcapsules smaller than 100 μm. Interfacial polymerization techniques are used generally to prepare the microcapsules. It is clear that PCM microcapsule materials require a physical deposition of a polymeric shell that encases the active material—for example, paraffin—as core. This physical encasement of the core is an expensive process as it requires a chemical in situ polymerization process or other deposition technique, for example, chemical vapor deposition. Moreover, the complete and comprehensive encapsulation of the core by the polymeric shell can interfere with the efficiency of the core material, which really provides the PCM character to the microcapsules.

The present invention addresses the above problems and provides PCM materials that are not a classic core-shell structure but wax-based microstructure that are colloidally protected in a casing by polymeric moieties such as PVOH that provides the same functionality by using paraffins with various melt point as core. However, the sol-called encapsulation in the present invention is not a physical deposition of the polymeric shell on a core, which is what the art teaches.

BRIEF DESCRIPTION OF THE FIGURES

The disclosed aspects will hereinafter be described in conjunction with the appended drawings, provided to illustrate and not to limit the disclosed aspects, wherein like designations denote the elements.

SUMMARY OF THE INVENTION

Figure 1:
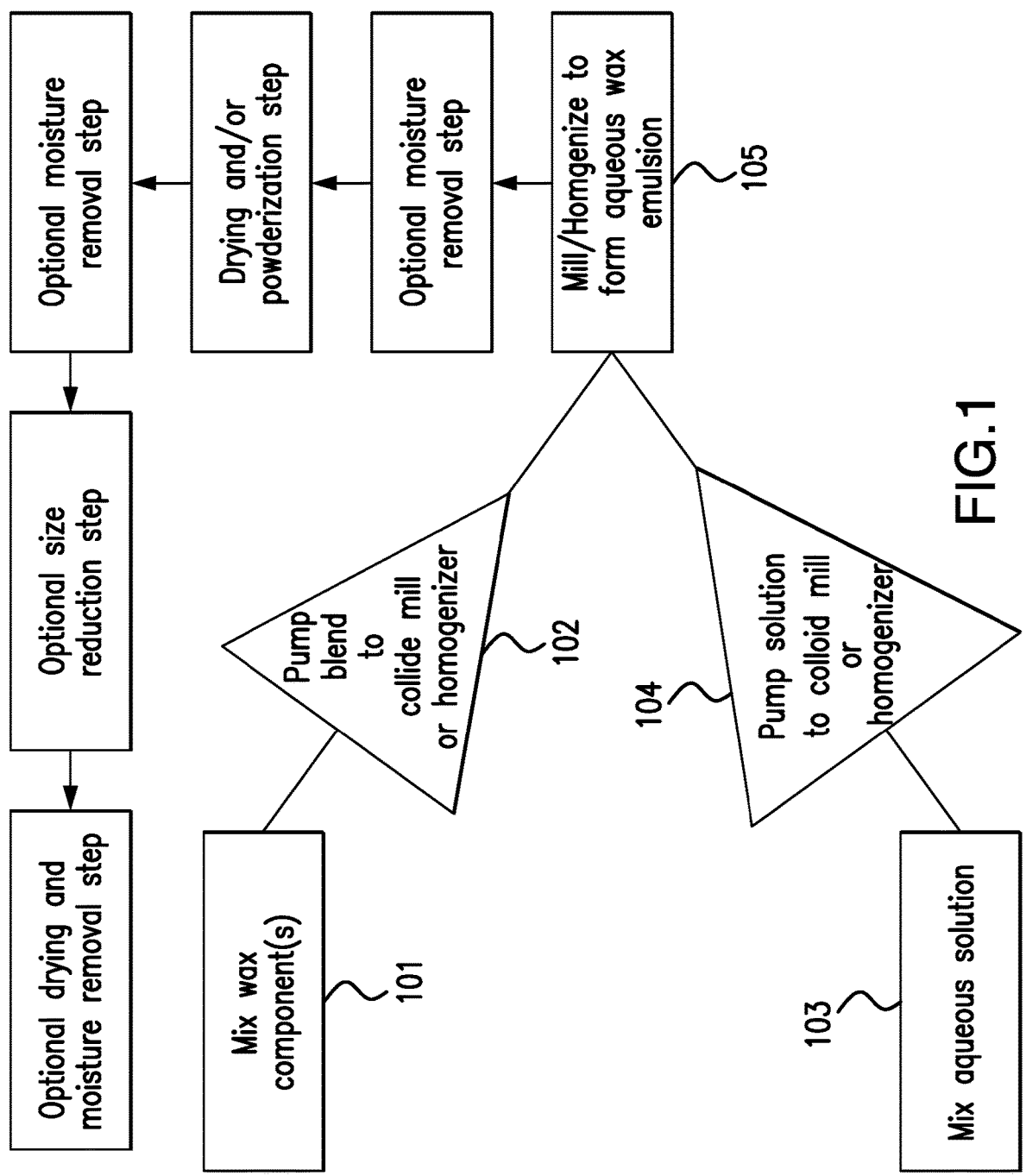
FIG. 1 illustrates a simple schematic process describing the method of the present invention.

This invention relates to a phase change material (PCM) comprising colloidally-protected wax-based (CPWB) microstructures. This invention further relates to such PCM, wherein said CPWB microstructure comprises:
(A) a wax core, and
(B) a polymeric shell;
  wherein said wax core comprises a paraffin component and a non-paraffin component;
    wherein said paraffin component comprises at least one linear alkane wax defined by the general formula $C_nH_{2n+2}$, where n ranges from 13-80;
    wherein said non-paraffin component comprises at least one wax selected from the group consisting of animal-based wax, plant-based wax, mineral wax, synthetic wax, a wax containing organic acids and/or esters, anhydrides, an emulsifier containing a mixture of organic acids and/or esters, and combinations thereof; and
  wherein said polymeric shell comprises at least one polymer selected from the group consisting of polyvinyl alcohol and copolymers, cellulose ethers, polyethylene oxide, polyethyleneimines, polyvinylpyrrolidone, and copolymers, polyethylene glycol, polyacrylamides and poly (N-isopropylamides), pullulan, sodium alginate, gelatin, starches, and combinations thereof.

This invention further relates to such PCM, wherein said PCM's temperature operating range is defined by the melting point of said paraffin component comprising at least one linear alkane wax defined by the general formula $C_nH_{2n+2}$, where n ranges from 13-80, and wherein said temperature operating range is characterized the corresponding pressure of the system in which said PCM is used.

This invention also relates to the PCM described above, wherein said PCM's temperature operating range is from −6° C. to 140°.

This invention also relates to a matrix structure comprising PCM as described above. In one embodiment, this invention further relates to such matrix structures, wherein said PCM is in an aqueous emulsion form or a powder form. In another embodiment, this invention relates to a such matrix structures, wherein the dry-solids weight percent of said PCM in said aqueous emulsion form, by weight of said matrix structure is in the range of from 10% to 50%; and wherein the solids weight content of the PCM in said dry powder form is in the range of from 1% to 50% by weight of said matrix structure. In one embodiment, said matrix structure is a construction wall, for example, a gypsum wallboard. In yet another embodiment, the matrix structure comprises said PCM in fine particle form coated on a paper or a plastic sheet.

This invention further relates to a process for preparing a powder form of PCM comprising CPWB microstructures, comprising the steps of
(A) providing at least one PCM in aqueous wax emulsion form;
(B) subjecting said PCM to at least one powder-making process; and
(C) optionally subjecting the resulting powder from step (B) to a size reduction process;
  wherein said emulsion is optionally subjected to additional drying before, during, or after said at least one powder-making process;
    wherein said at least one powder-making process is selected from the group consisting of freeze drying; lyophilization, vacuum drying; air drying; spray drying; atomization; evaporation; tray drying; flash drying; drum drying; fluid-bed drying; oven drying; belt drying; microwave drying; solar drying; linear combinations thereof; and parallel combinations thereof.

This invention also relates to the powder prepared by the process described above. In one embodiment, the powder form of PCM comprises particles in the average particle size range of from about 1 to about 1000 micron. In another embodiment, said powder form of PCM comprises particles such that about 10%, 50% and/or 90% of the particles by weight are less than the average particle size within the range of from 1 to 1000 micron. In yet another embodiment, said powder comprises dried 1-5 mm chips.

DETAILED DESCRIPTION

The terms "approximately", "about", and "substantially" as used herein represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount.

Embodiments of the present disclosure provide a powder that is prepared from a wax based colloidal dispersion. The present invention also relates to methods for preparing powders from such wax based colloidal dispersions.

Definitions

For the purposes of this invention, a "colloidal dispersion" is a dispersion of a discontinuous phase in a continuous phase.

By "wax" is meant any naturally occurring or synthetically occurring wax. It also includes blends or mixtures of one or more naturally occurring and/or synthetically occurring waxes. Those of animal origin typically consist of wax esters derived from a variety of carboxylic acids and fatty alcohols. The composition depends not only on species, but also on geographic location of the organism. Because they are mixtures, naturally produced waxes are softer and melt at lower temperatures than the pure components.

By "wax-based colloidal dispersion" is meant an aqueous or non-aqueous colloidally occurring dispersion or mixture that is in liquid or paste like form comprising wax materials. A wax-based colloidal dispersion may also include the class of materials that are a suspension or other colloidal mixture comprising wax. It may also include wax-based emulsions.

By "wax-based emulsion" is meant an aqueous or non-aqueous, colloidally occurring dispersion or mixture in a liquid or paste-like form comprising wax materials, which has both the discontinuous and the continuous phases as liquid. For example, an aqueous wax system can either be a general colloid, or it can be an emulsion (which is a type of colloid), depending on the melt temperature of the emulsified wax versus the use temperature.

By colloidally-protected wax-based microstructure is meant a colloidal dispersion or emulsion, wherein the continuous and the discontinuous phase is liquid that is capable of phase change during the melting point transition of the core material. The microstructure is colloidally protected with a wax or a lower fraction hydrocarbon core. The microstructure can exist in a dispersion or emulsion form or as a powder with reduced moisture or minimal moisture or no moisture.

PCM Materials

This invention relates to PCM materials that comprise colloidally protected wax-based microstructures. Colloidally protected wax-based microstructures have a wax core and casing of polymeric moieties which are adhered to the core via secondary forces such as Van Der Waals forces as opposed to a mechanical shell over a core in a classical core-shell structure. Colloidally-protected wax-based microstructures are described in detail below. The core may be fully or partially encapsulated, in that the colloidal shell is not a physical shell like a typical core-shell structure used in variety of applications including as PCM materials.

The PCM materials of the present invention are aqueous systems or dry systems with minimal to zero moisture content. These PCM materials may or may not be incorporated in a matrix for further use as phase change materials, where temperature fluctuations and heat absorption and desorption in a particular narrow range are desired.

If the PCM materials are aqueous systems, for example aqueous wax-based colloidal dispersions, the dry solids weight content of the colloidally protected wax-based microstructures in the matrix is from about 10% to about 50% by weight. Stated another way, the dry solids weight content of the colloidally protected wax-based microstructures by weight percent of the matrix is any number from the following: 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, and 50.

The dry solids weight content of the colloidally protected wax-based microstructures is also within a range defined by any two numbers above, including the endpoints of such a range.

If the PCM materials are dry systems, for example, powder or particulate or chip form comprising colloidally-protected wax-based microstructures that have been dried, the solids weight content of the colloidally protected wax-based microstructures in the matrix is from about 1% to about 50% by weight of the matrix. Stated another way, the dry solids weight content of the colloidally protected wax-based microstructures by weight percent of the matrix is any number from the following: 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, and 50.

The dry solids weight content of the colloidally protected wax-based microstructures is also within a range defined by any two numbers above, including the endpoints of such a range.

The polymers selected for the shell of the colloidally-protected wax-based microstructures for PCM applications are one or more of the following:

Polyvinyl alcohol and copolymers, cellulose ethers, polyethylene oxide, polyethyleneimines, polyvinylpyrrolidone, and copolymers, polyethylene glycol, polyacrylamides and poly (N-isopropylamides, pullulan, sodium alginate, gelatin, and starches.

The core of the colloidally-protected wax-based microstructures can be a paraffin wax that is a linear alkane with a general formula of $C_nH_{2n+2}$, wherein n varies from 13 to 80. The paraffin wax defined by n=13 is called tridecane and the one with n=80 is octacontane. The melting point of $C_{13}$ wax is −5.4° C. Similarly, the melting point of the C60 wax is 100° C. Similarly, the melting point of higher waxes (between C60 and C80) is higher than 100° C. but lower than the melting point of the colloidally-protective polymeric shell. Depending upon the narrow temperature range in which the PCM material is to be used, one could tailor a colloidally-protected wax-based microstructure with a specific wax core within it that melts and phase changes in that particular temperature range.

The temperature range in which the phase change is to be effected will dictate the wax that is to be used. In order to arrive at a specific temperature range within which the wax will melt can be determined by the carbon number of the wax, as well as the branching of the chains in the wax (branched structures). Some embodiments of the present invention envision wax that comprises branched structures as well as a blend or mixture of linear and branched structures of the wax. This invention also embodies mixtures or blends of waxes with two or more carbon numbers that may either be linear, branched, or blends of linear and branched structures. For example, a wax could be a mixture of C15 linear and $C_{20}$ linear hydrocarbon alkane wax. In another example, the wax could be a mixture of $C_{16}$ linear and $C_{16}$ branched hydrocarbon alkane wax. In yet another example, the wax could be a mixture of $C_{15}$ linear, C16, linear, and $C_{20}$ branched. In yet another example, the wax could be a mixture of $C_{18}$ linear, $C_{18}$ branched.

Preferred paraffins or waxes include the $C_{14}$ to $C_{34}$ waxes. Further preferred waxes are $C_{17}$ and $C_{18}$. In the table below are given the melting point and latent heat of fusion in kJ/kg of various paraffins or waxes classified by their carbon numbers.

TABLE 1

| No. of Carbon Atoms | Melting Point ° C. | Latent Heat of Fusion (kJ/kg) |
|---|---|---|
| 14 | 5.5 | 228 |
| 15 | 10 | 205 |
| 16 | 16.7 | 237.1 |
| 17 | 21.7 | 213 |
| 18 | 28.0 | 244 |
| 19 | 32.0 | 222 |
| 20 | 36.7 | 246 |
| 21 | 40.2 | 200 |
| 22 | 44.0 | 249 |
| 23 | 47.5 | 232 |
| 24 | 50.6 | 255 |
| 25 | 49.4 | 238 |
| 26 | 56.3 | 256 |
| 27 | 58.8 | 236 |
| 28 | 61.6 | 253 |
| 29 | 63.4 | 240 |
| 30 | 65.4 | 251 |
| 31 | 68.0 | 242 |
| 32 | 69.5 | 170 |
| 33 | 73.9 | 268 |
| 34 | 75.9 | 269 |

The temperature range in which the phase change materials can be used is from about −6° C. to about 140° C. Stated another way, the phase change materials can be used at following temperatures measured in ° C.: −6, −5, −4, −3, −2, −1, 0, 1, 2, 3, 4, 5, 6, 7, 8, 9, 10, 11, 12, 13, 14, 15, 16, 17, 18, 19, 20, 21, 22, 23, 24, 25, 26, 27, 28 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, and 140.

The temperature range in which the phase change materials can be used is also defined by any two numbers above, including the endpoints of such a range.

For those waxes that melt at temperatures above 100° C., for example, C60 (hexacontane) melts at 100° C., an aqueous dispersion can be prepared from such waxes by operating the dispersion preparation process under pressure. Because water boils at higher temperature at pressures greater than 1 atmosphere, the high-pressure process enables making colloidally-protected wax-based dispersions and emulsions that melt at temperatures greater than 100° C. Once such colloidal dispersion is prepared, if the pressure is reduced before the lowering of temperature, the water will flash off, rendering particulate PCM materials, for example in powder form, or flakes, or chips. On the other hand, if the temperature is lowered before the lowering of pressure, an aqueous system will result that will have colloidally-protected wax-based microstructures that have a solidified core of the wax. Clearly, the phase change of such materials will be effected only at temperatures higher than 100° C., and thus, one will have to contend with evaporation of the aqueous phase when such PCM materials are actually used. These aqueous PCM materials with a wax core that melts at temperatures above the boiling point of water can be used under pressure higher than the atmospheric pressure.

For those waxes that melt at temperatures below 100° C., for example, C30 (triacontane) melts at 66° C., an aqueous colloidal dispersion can be prepared from such waxes by operating the dispersion preparation process at atmospheric pressure or partially reduced pressure. After such colloidally-protected wax-based aqueous dispersion is prepared, if the pressure is reduced further before the lowering of temperature, the water will flash off, rendering particulate PCM materials, for example in powder form, or flakes, or chips, with reduced or no moisture content. On the other hand, if the temperature is lowered before the lowering of pressure, an aqueous system will result that will have colloidally-protected wax-based microstructures that have solidified core of the wax. Clearly, the phase change of such materials will be effected around the melting point of the core wax.

Clearly, for paraffin waxes that melt below the room temperature and around it, can be made into colloidally-protected wax-based microstructures at 1 atmosphere pressure. PCMs of the present invention have many advantages. They melt in the desired operating temperature range, have a high latent heat of fusion per unit volume, high specific heat to provide additional heat storage, small volume change on phase transformation, small vapor pressure at operating temperature (in fact, minimal vapor pressure due to encapsulation in a colloidally protected microstructure), and congruent melting of the PCM for constant storage capacity. Other properties include high nucleation rate to avoid supercoiling of the liquid phase and high crystal growth rate. Chemical properties of the PCM of the present invention include complete reversible freeze/melt no degradation after a large number of freeze/melt cycle, no corrosiveness of the construction materials, non-toxicity, and non-flammability.

In some examples, the PCM layer can be placed within wall constructions to increase the thermal mass of the house. This invention also envisions sheets of paper or plastic (reinforced or otherwise) that can be coated with fine particles of the present PCM materials. Thus the coated sheet acts as a PCM material.

For example, a PCM layer can be placed within the wall close to the external layer in a wall application. During the day, the PCM layer will store energy that flows into the wall. During night time, the PCM layer will release the energy stored in the day, outside and inside the building depending upon the insulation layers' positioning. The PCM layer can be placed within the wall close to the external layer with a ventilated air chamber. In other embodiments, the PCM layer can be placed behind a glass and an air chamber. The PCM layer can be placed within wall constructions to increase ether thermal mass of the house. PCM materials can also be used in ceilings. They can also be used in heat exchange and in hydraulic systems.

Waxes usable as core in the PCM materials of the present invention are described infra.

Waxes

For the purposes of the present invention, waxes include naturally occurring waxes and synthetic waxes. Naturally occurring waxes include plant based waxes, animal waxes, and mineral waxes. Synthetic waxes are made by physical or chemical processes.

Examples of plant based waxes include mixtures of unesterified hydrocarbons, which may predominate over esters. The epicuticular waxes of plants are mixtures of substituted long-chain aliphatic hydrocarbons, containing alkanes, alkyl esters, sterol esters, fatty acids, primary and secondary alcohols, diols, ketones, aldehydes, aliphatic aldehydes, primary and secondary alcohols, β-diketones, triacylglycerols, and many more. The nature of the other lipid constituents can vary greatly with the source of the waxy material, but they include hydrocarbons, Plant leaf surfaces are coated with a thin layer of waxy material. Specific examples of plant wax include Carnauba wax, which is a hard wax obtained from the Brazilian palm *Copernicia prunifera*, which contains the ester myricyl cerotate. Other plant based waxes include candelilla wax, ouricury wax, jojoba plant wax, bayberry wax, Japan wax, sunflower wax, tall oil, tallow wax, rice wax, and tallows.

Animal wax includes beeswax as well as waxes secreted by other insects. A major component of the beeswax used in constructing honeycombs is the ester myricyl palmitate which is an ester of triacontanol and palmitic acid. Spermaceti occurs in large amounts in the head oil of the sperm whale. One of its main constituents is cetyl palmitate, another ester of a fatty acid and a fatty alcohol. Lanolin is a wax obtained from wool, consisting of esters of sterols. Other animal wax examples include lanocerin, shellac, and ozokerite.

Examples of mineral waxes include montan wax, paraffin wax, microcrystalline wax and intermediate wax. Although many natural waxes contain esters, paraffin waxes are hydrocarbons, mixtures of alkanes usually in a homologous series of chain lengths. Paraffin waxes are mixtures of saturated n- and iso-alkanes, naphthenes, and alkyl- and naphthene-substituted aromatic compounds. The degree of branching has an important influence on the properties. Montan wax is a fossilized wax extracted from coal and lignite. It is very hard, reflecting the high concentration of saturated fatty acids/esters and alcohols. Montan wax includes chemical components formed of long chain alkyl acids and alkyl esters having chain lengths of about 24 to 30 carbons. In addition, natural montan includes resin acids, polyterpenes and some alcohol, ketone and other hydrocarbons such that it is not a "pure" wax. The saponification number of montan, which is a saponifiable wax, is about 92 and its melting point is about 80° C. In addition to montan wax, other naturally derived waxes are known for use in various industries and include petroleum waxes derived from crude oil after processing, which include macrocrystalline wax, microcrystalline wax, petrolatum and paraffin wax. Paraffin wax is also a natural wax derived from petroleum and formed principally of straight-chain alkanes having average chain lengths of 20-30 carbon atoms.

Synthetic waxes include waxes based on polypropylene, polyethylene, and polytetrafluoroethylene. Other synthetic waxes are based on fatty acid amines, Fischer Tropsch, and polyamides. Polyethylene and related derivatives. Some waxes are obtained by cracking polyethylene at 400° C. The products have the formula $(CH_2)_nH_2$, where n ranges between about 50 and 100.

Also outside of the building products context, in addition to waxes that occur in natural form, there are various known synthetic waxes which include synthetic polyethylene wax of low molecular weight, i.e., molecular weights of less than about 10,000, and polyethylenes that have wax-like properties. Such waxes can be formed by direct polymerization of ethylene under conditions suitable to control molecular weight. Polyethylenes with molecular weights in about the 2,000-4,000 range are waxes, and when in the range of about 4,000-12,000 become wax resins.

Fischer-Tropsch waxes are polymethylene waxes produced by a particular polymerization synthesis, specifically, a Fischer-Tropsch synthesis (polymerization of carbon monoxide under high pressure, high temperature and special catalysts to produce hydrocarbon, followed by distillation to separate the products into liquid fuels and waxes). Such waxes (hydrocarbon waxes of microcrystalline, polyethylene and polymethylene types) can be chemically modified by, e.g., air oxidation (to give an acid number of 30 or less and a saponification number no lower than 25) or modified with maleic anhydride or carboxylic acid. Such modified waxes are more easily emulsified in water and can be saponified or esterified. Other known synthetic waxes are polymerized alpha-olefins. These are waxes formed of higher alpha-olefins of 20 or more carbon atoms that have wax like properties. The materials are very branched with broad molecular weight distributions and melting points ranging about 54° C. to 75° C. with molecular weights of about 2,600 to 2,800. Thus, waxes differ depending on the nature of the base material as well as the polymerization or synthesis process, and resulting chemical structure, including the use and type of any chemical modification.

Various types of alpha-olefin and other olefinic synthetic waxes are known within the broad category of waxes, as are chemically modified waxes, and have been used in a variety of applications, outside the water-resistant wallboard area. They are of a wide variety and vary in content and chemical structure. As noted above, water-resistant wallboard products generally use paraffin, paraffin and montan, or other paraffinic or synthetic waxes as described above in the mentioned exemplary patent references. While various waxes and wax substitutes have been used and tried in the building products area for wax emulsions generally, particularly in some cases with a goal toward finding an adequate substitute for use of montan wax, the waxes as have been adopted to date do not include normal alpha-olefin or oxidized alpha-olefin waxes.

In one embodiment of the invention, the wax used for the preparation of the dispersion or emulsion is used in a micronized, pulverized form. U.S. Pat. Nos. 8,669,401 and 4,846,887 show exemplary micronization processes. Both these patents are incorporated by reference herein as if fully set forth.

In one embodiment, the emulsifiers for this invention include montan wax, esters/acids, styrene-maleic anhydride, polyolefin maleic anhydride, or other anhydrides, carnauba wax, rice wax, sunflower wax.

Colloidally-Protected Wax-Based Microstructures

Generally speaking, two scientific theories have been proposed to explain the stability of colloidally-protected wax-based microstructures that comprise the PCM materials of the present invention, namely, steric hindrance or electrostatic repulsion. Applicants do not wish to be bound by these theories. Applicants believe their invention relates to wax-based dispersions that may or may not relate to the two theories. It is possible that one or both theories or neither of the two may explain the colloidally-protected wax-based microstructures of the present invention.

In one embodiment, this invention relates to process for preparing PCM materials in powder form. These PCM materials in powder form are prepared from wax-based dispersions. For example, the following patent references describe wax-based emulsions. These references are set forth as if full incorporated herein.

Several wax emulsion formulations are disclosed in U.S. Pat. No. 5,437,722, which are incorporated by reference herein. It describes a water-resistant gypsum composition and wax emulsion therefore, which includes a paraffin hydrocarbon having a melting point of about 40° C. to 80° C., about 1 to 200 parts by weight montan wax per 100 parts of the paraffin hydrocarbon, and about 1 to 50 parts by weight polyvinyl alcohol per 100 parts of the paraffin hydrocarbon.

U.S. Publication No. 2006/0196391 describes use of triglycerides in emulsions, and notes that the prior art has made use of petroleum waxes and synthetic waxes such as Fischer Tropsch and polyethylene waxes, which have been used for purposes similar to those of the invention of Publication 2006/0196391 with mixed results.

In the building products area, U.S. Patent Publication No. 2007/0181035 A1 is directed to a composition for use in making medium density fiberboard (MDF). The composition has a component for reducing surface tension and improving dimensional stability for use in oriented strand board and MDF. The surface tension agents are either fluorinated hydrocarbon compounds of two to six carbons or alkoxylates of alkyl phenols or alkylated acetylene diols. These materials are provided to a composition having a combination of montan wax with other waxes, ammonium hydroxide for saponification, water and polyvinyl alcohol. Nonsaponifiable waxes may be used in this composition, including paraffin and scale or slack wax (which is petroleum derived). Saponifiable waxes which may be used include Montan, petroleum wax, and various natural waxes.

U.S. Patent Publication No. 2007/0245931 A1 discloses use of alkyl phenols in emulsions for water-proof gypsum board. The alkyl phenols are long-chain hydrocarbon chains having a phenolated ring of 24-34 carbon chain lengths. The publication describes use of lignosulfonic acid, and magnesium sulfate. The wax components can be combinations of paraffin and montan. The patent claims that the compositions are stable without the use of starch as in prior U.S. Pat. No. 6,663,707 of the same inventor. The wax used in the composition may be various commercially known waxes having a melting point of from about 120° F. (48.9° C.) to 150° F. (65.6° C.) with low volatility and a high molecular weight with carbon chain lengths of 36 or higher. The hydrocarbon wax component includes waxes known in the field of gypsum slurries.

U.S. Pat. No. 6,890,976 describes an aqueous emulsion for gypsum products with hydrocarbon wax, polyolefin-maleic anhydride graft polymer and polyvinyl alcohol and/or acetate. The maleic-modified material is known as FLO-ZOL®. The hydrocarbon wax can be paraffin or a polyethylene wax, maleated hydrocarbon wax or combinations thereof. The wax can also be a synthetic wax ester or an acid wax. The polyolefin-maleic anhydride graft copolymer is a 50-500 carbon chain graft copolymer, which when provided to the wax emulsion is described as providing improved water repellency to a final gypsum product.

U.S. Patent Publication No. 2004/0083928 A1 describes a suspension, instead of an emulsion, of various waxes in water that is mixed directly with gypsum. In describing the waxes, the suspensions can include polyethylene wax, maleated hydrocarbons and other waxes as well as wax combinations.

U.S. Pat. No. 7,192,909 describes use of polyolefin wax in an application outside the building products area, which is as a lubricant for plastics processing, specifically for PVC. The waxes are described as homopolymers and copolymers of various alpha-olefins that have been modified in a polar manner (oxidized) or grated with polar reagents. They can be used alone or in combination with other waxes, e.g. montan waxes, fatty acid derivatives or paraffins. As described in FIG. 1, in the first step, a colloidally-protected wax based microstructures in a dispersion or emulsion are prepared. The dispersion or emulsion is prepared according to the specification for their use in variety of applications. For a general understanding of the method of making the exemplary wax emulsion, reference is made to the flow diagram in FIG. 1. As shown in 101, first the wax components may be mixed in an appropriate mixer device. Then, as shown in 102, the wax component mixture may be pumped to a colloid mill or homogenizer. As demonstrated in 103, in a separate step, water, and any emulsifiers, stabilizers, or additives (e.g., ethylene-vinyl alcohol-vinyl acetate terpolymer) are mixed. Then the aqueous solution is pumped into a colloid mill or homogenizer in 104. Steps 101 and 103 may be performed simultaneously, or they may be performed at different times. Steps 102 and 104 may be performed at the same time, so as to ensure proper formation of droplets in the emulsion. In some embodiments, steps 101 and 102 may be performed before step 103 is started. Finally, as shown in 105, the two mixtures from 102 and 104 are milled or homogenized to form an aqueous wax-based emulsion.

In the next step, if the said colloidally-protected wax-based microstructures are desired in a dry powder form, then said dispersion or emulsion is subjected to the drying and powderization step. Drying can be accomplished by one or more of the known drying methods such as freeze drying, vacuum drying, air drying, spray drying, atomization, evaporation, tray drying, flash drying, drum drying, fluid-bed drying, oven drying, belt drying, microwave drying, lyophilization, and solar drying. Other known drying methods that may not be listed herein, may also be used. In one embodiment, more than one method may be used to dry the colloidal dispersion.

Further as shown in FIG. 1, in the third step, optionally, the moisture content of the powder material may be adjusted to suit the use of the powder in a particular application. In the next step, which also is an optional step, the powder may be subjected to a further pulverization process to provide for a specific particle size distribution of the powder. Finally, the resulting powder is then blended with a base material to improve the properties of the base material, for example, its ability to dampen temperature fluctuations as well as, or in the alternative, its moisture repellency.

The powder resulting from step 2 in the process described above, may have an average particle size in the range of from about 1 micron to about 1,000 micron. Clearly, the larger sized particles would be agglomerates of the smaller powder emulsion particles. Theoretically, the smallest particle will be a wax particle that is covered, for example, by a hydrogen-bonded coating of a stabilizing polymeric chains of, for example, among other things, polyvinyl alcohol and copolymers, cellulose ethers, polyethylene oxide, polyethyleneimines, polyvinylpyrrolidone, and copolymers, polyethylene glycol, polyacrylamides and poly (N-isopropylamides, pullulan, sodium alginate, gelatin, and starches.

The average particle size of the PCM powders of the present invention can be any one of the following average particle sizes, measured in microns: 1, 2, 3, 4, 5, 6, 7, 8, 9, . . . , 98, 99, 100, 101, 102, . . . , 198, 199, 200, 201, 202, . . . , 298, 299, 300, 301, 302, . . . , 398, 399, 400, 401, 402, . . . , 498, 499, 500, 501, 502, . . . , 598, 599, 600, 601, 602, . . . , 698, 699, 700, 701, 702, . . . , 798, 799, 800, 801, 802, . . . , 898, 899, 900, 901, 902, . . . , 998, 999, and 1000.

The average particle size can also be in a range that is determined by any two numbers recited above, which would include the endpoints of the range.

Alternatively, the colloidal dispersions, including the emulsions, can be dried into 2-5 mm chips, which could be regular shaped or irregular shaped. Clearly such chips would be loose agglomeration of the colloidally dispersed or emulsified particles.

In one embodiment, the particle size of the powders of the present invention is also such that 10%, 50% and/or 90% of the particles by weight are less than the following average particle size, measured in microns: 1, 2, 3, 4, 5, 6, 7, 8, 9, . . . , 98, 99, 100, 101, 102, . . . , 198, 199, 200, 201, 202, . . . , 298, 299, 300, 301, 302, . . . , 398, 399, 400, 401, 402, . . . , 498, 499, 500, 501, 502, . . . , 598, 599, 600, 601, 602, . . . , 698, 699, 700, 701, 702, . . . , 798, 799, 800, 801, 802, . . . , 898, 899, 900, 901, 902, . . . , 998, 999, and 1000.

The average particle size can also be in a range that is determined by any two numbers recited above, which would include the endpoints of the range.

Figure 2:
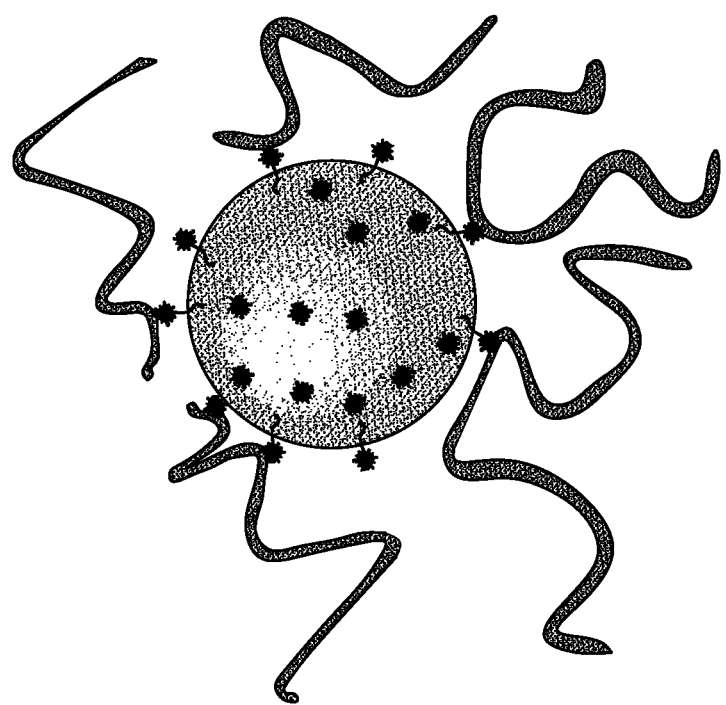
FIG. 2 illustrates a schematic describing the theoretical structure of the emulsified wax particle.
Figure 2:
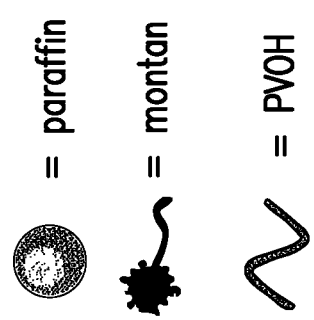

Alternatively, the colloidal dispersions, including the emulsions, can be dried into 1-5 mm chips, which could be regular shaped or irregular shaped. Clearly such chips would be agglomeration of the colloidally dispersed or emulsified particles. Such chips could be of the following average particle size: 1, 1.5, 2, 2.5, 3, 3.5, 4. 4.5, and 5 mm. Such chips could also be within the range formed by any two numbers of this list including the end-points of such a range. FIG. 2 describes the particle model of a unitary wax particle that has been stabilized in the colloidal dispersion. Applicants do not wish to be bound by the theory of the unitary wax particle stabilized in the dispersion. According to this model, a wax particle is tethered to another wax particle, for example, paraffin wax and montan wax respectively. The montan wax is then tethered to polyvinyl alcohol. The molecular level attraction between the wax and montan wax, and the PVOH with both montan and paraffin wax, is secondary in nature as opposed to ionic or covalent chemical bonds.

The first mechanism by which many of the wax emulsions (colloidal dispersions) are stabilized is the steric hindrance mechanism. According to this mechanism, high molecular weight polymers (e.g. PVOH) are tethered to the outer surface of a wax particle and surround it. Due to steric hindrance, the PVOH molecules surrounding each wax particle then prevent adjacent wax particles from coalescing.

Alternatively, electrostatic repulsion helps with the stabilization of the colloidal dispersions. In this mechanism, the wax particle, which contains acid or ester groups (either inherently or mixed in), is first saponified with a base, converting the acid or ester groups to negatively charged carboxylate moieties. Because of their polar nature, these negatively charged carboxylate moieties exist at the water/wax interface, giving the wax particle a net negative charge. These negative charges on adjacent wax particles then constitute a repulsive force between particles that effectively stabilizes the dispersion (emulsion).

Thus, according to one model, as shown in FIG. 2, a wax particle is enclosed in a "web" of PVOH polymeric chains. This is not akin to a shell of a core-shell particle, but the PVOH loosely protects (colloidally protects) the wax particle. One could envision the wax particle as a solid ball or a nucleus surrounded by polymeric chains like strings. While the polymer does not form a shell like physical casing, the casing herein is based on secondary forces of attraction, e.g., Van der Waals forces. Hydrogen bonding may also be one of the forces for the encapsulation of the PVOH of the wax particles. Applicants do not wish to be bound by this theory. However, the model does explain the wax particle with the PVOH casing over it. In the above examples, PVOH is used as an exemplary polymeric system. However, other polymeric systems used herein, or their combinations can also be used to prepare the colloidally-protected wax-based microstructures.

In one embodiment, the model shown in FIG. 2 describes a wax-based dispersion or wax-based emulsion or a dispersion or emulsion of colloidally-protected wax-based microstructures from which a powder is made. Such powder, still a colloidally-protected wax-based microstructures is used as a phase change material. A phase-change material (PCM) is a substance with a high heat of fusion which, melting and solidifying at a certain temperature, is capable of storing and releasing large amounts of energy. Heat is absorbed or released when the material changes from solid to liquid and vice versa; thus, PCMs are classified as latent heat storage (LHS) units. The phase change herein would be the solid-liquid phase change. Depending on the molecular weight and the type of wax material used, one could tailor the phase change for various temperatures. U.S. Pat. No. 6,939,610 describes phase change materials. This patent is incorporated by reference as if fully set forth herein.

According to one theory, which the Applicants do not wish to be bound by, the polymeric chains surrounding the wax particle colloidally protect the wax particle such that even with the phase change from solid to liquid of the wax, the liquefied wax does not "bleed" out from between the polymeric chains or polymeric chain clusters. This is as a result of secondary Van der Walls' forces, and/or surface tension. So, while it could be argued that the colloidal protection is not physically encapsulating, for all practical purposes, it is, in that the surface tension will not permit the wax to ooze out or bleed out through the polymeric shell.

The powder form of the colloidally protected wax based microstructures allows for easy addition to base materials or matrix materials for a variety of applications. Some potential PCM applications include wax-based emulsion or dispersion as coating formulations for fuel tanks in space vehicles, or for the space craft as a whole. See for example U.S. Pat. App. No. 20080005052 which is incorporated by reference herein. The powders of the present invention potentially can be blended with high temperature organic resins (such as silicone resins) to provide high temperature heat sinks. In another example, high temperature has a disastrous effect on the longevity of batteries in electric vehicles (Tesla, Nissan Leaf, Prius, etc.). PCMs are used to address this issue. See for example http://chargedevs.com/features/allcell-technologies%E2%80%99-new-phase-change-thermal-management-material/.

Other applications include thermal insulating coating for aircrafts, see for example U.S. Pat. No. 6,939,610, which is also incorporated by reference herein. The PCMs of the present invention can also be used in the polyurethane OEM application for spray foam. The R value of the foam should improve once the powder is added. In one embodiment, only a coating is developed that will be first applied unto a substrate (e.g., directly onto the attic frame) and then followed with a spray of regular insulating foam. The R-value of the system should then be much improved than just the PU foam alone.

In consumer products, where the outside case becomes too hot, the powder of the present invention can be applied as a coating to the inside of the outer casing, thus keeping the outer casing cool even when the water inside is boiling, e.g., a safety kettle. Other applications include astroturf (Astroturf: http://www.microteklabs.com/field-turf.html) and coatings for military desert tents, military hardware etc.

Other applications include automotives such as batteries and vehicle coatings; interior coatings in airplanes and space vehicles; in building and construction industry; consumer products such as pizza delivery coffee making, etc.; and in non-washable fabrics such as tents and fabrics. PCM materials of the present invention can also be used for smart textiles. See S. Mondal, Phase change materials for smart textiles-An overview, Appl. Therm. Eng. (2007), doi: 10.1016/j.applthermaleng.2007.08.009. This scholarly paper is articulated by reference herein.

In other words, in all applications paraffin-based encapsulated PCMs are used today, the present invention provides a powder of unencapsulated wax particles that are colloidally protected in a casing by polymeric moieties such as PVOH that proves the same functionality using a variety of melt point paraffins.

An exemplary wax-based colloidal dispersion system is described herein, which can be rendered into the embodiment of the present invention, that is, a dried emulsified powder that retains some level of chemical as well as structural attributes of the colloidally dispersed (emulsified) particles.

A report from the U.S. Department of Energy under the Building Technology Program, by Jan Kosny, Nitin Shukla, and Ali Fallahi, titled, "Cost Analysis of Simple Phase-Change Material-Enhanced Building Envelopes describe various applications of the PCM materials in building technology and construction (published in January 2013, available electronically at http://www.osti.gov/bridge—NREL Contract No. DE-AC36-08GO28308). This reference is incorporated herein as if set forth fully.

PCM materials of the present invention can also be used in building applications for under-the-floor applications, in air exchanger applications, and as components of a wall. Other applications include encapsulation of the PCM materials of the present invention in plastic or metal packaging aluminum or steel, for example). PCM materials can also be used for impregnation of porous materials as panel board and concrete.

Colloidally-Protected Microstructures Including Moisture Resistant Stabilizers

Exemplary colloidally-protected wax-based microstructures for use in, for example, a water-resistant joint compound are now described in greater detail, as follows. The wax-based emulsion can be spray dried into a powder form for subsequent use to be blended with joint compound in building construction to impart water resistance and temperature dampening effect.

In one embodiment, the wax emulsion may comprise water, a base, one or more waxes optionally selected from the group consisting of slack wax, montan wax, and paraffin wax, and a polymeric stabilizer, such as ethylene-vinyl alcohol-vinyl acetate terpolymer or polyvinyl alcohol. Further, carnauba wax, sunflower wax, tall oil, tallow wax, rice wax, and any other natural or synthetic wax or emulsifier containing organic acids and/or esters can be used to form the wax emulsion. Generally, the wax emulsion may be used in the manufacture of composite wallboard. But in this case, the wax emulsion is further subjected to a powder-making step.

Water may be provided to the emulsion, for example in amounts of about 30% to about 60% by weight of the emulsion. The solids content of the wax emulsion is preferably about 40% to about 70% by weight of the emulsion. Other amounts may be used.

In some embodiments, a dispersant and/or a surfactant may be employed in the wax emulsions. Optional dispersants, include, but are not limited to those having a sulfur or a sulfur-containing group(s) in the compound such as sulfonic acids ($R-S(=O)_2-OH$) and their salts, wherein the R groups may be otherwise functionalized with hydroxyl, carboxyl or other useful bonding groups. In some embodiments, higher molecular weight sulfonic acid compounds such as lignosulfonate, lignosulfonic acid, naphthalene sulfonic acid, the sulfonate salts of these acids and deriva- tized or functionalized versions of these materials are used in addition or instead. An example lignosulfonic acid salt is Polyfon® H available from MeadWestvaco Corporation, Charleston, S.C. Other dispersants may be used, such as magnesium sulfate, polycarboxylate technology, ammonium hepta molybdate/starch combinations, non-ionic surfactants, ionic surfactants, zwitterionic surfactants and mixtures thereof, alkyl quaternary ammonium montmorillonite clay, etc. Similar materials may also be used, where such materials may be compatible with and perform well with the formulation components.

In one embodiment, a dispersant and/or surfactant may comprise about 0.01% to about 5.0% by weight of the wax emulsion formulation composition, preferably about 0.1% to about 2.0% by weight of the wax emulsion formulation composition. Other concentrations may be used.

The wax component of the emulsion may include at least one wax which may be slack wax, or a combination of montan wax and slack wax. The total wax content may be about 30% to about 60%, more preferably about 30% to about 40% by weight of the emulsion. Slack wax may be any suitable slack wax known or to be developed which incorporates a material that is a higher petroleum refining fraction of generally up to about 20% by weight oil. In addition to, or as an alternative to slack wax, paraffin waxes of a more refined fraction are also useful within the scope of the invention.

Suitable paraffin waxes may be any suitable paraffin wax, and preferably paraffins of melting points of from about 40° C. to about 110° C., although lower or higher melting points may be used if drying conditions are altered accordingly using any techniques known or yet to be developed in the composite board manufacturing arts or otherwise. Thus, petroleum fraction waxes, either paraffin or microcrystalline, and which may be either in the form of varying levels of refined paraffins, or less refined slack wax may be used. Optionally, synthetic waxes such as ethylenic polymers or hydrocarbon types derived via Fischer-Tropsch synthesis may be included in addition or instead, however paraffins or slack waxes are preferred in certain embodiments. The wax emulsion used in the joint compound can be formed from slack wax, montan wax, paraffin wax, carnauba wax, tall oil, sunflower wax, rice wax, and any other natural or synthetic wax containing organic acids and/or esters, or combinations thereof. For example, synthetic wax used in the joint compound may comprise ethylenic polymers or hydrocarbon types, optionally derived via Fischer-Tropsch synthesis, or combinations thereof. Optionally, the synthetic waxes can be added in concentrations ranging from about 0.1% to about 8% of the dry weight of the joint compound or from about 0.5% to about 4.0% of the dry weight of the joint compound.

In some embodiments, the wax emulsion is stabilized by polyvinyl alcohol.

Montan wax, which is also known in the art as lignite wax, is a hard, naturally occurring wax that is typically dark to amber in color (although lighter, more refined montan waxes are also commercially available). Montan is insoluble in water, but is soluble in solvents such as carbon tetrachloride, benzene and chloroform. In addition to naturally derived montan wax, alkyl acids and/or alkyl esters which are derived from high molecular weight fatty acids of synthetic or natural sources with chain lengths preferably of over 18 carbons, more preferably from 26 to 46 carbons that function in a manner similar to naturally derived montan wax are also within the scope of the invention and are included within the scope of "montan wax" as that term is used herein unless the context indicates otherwise (e.g., "naturally occurring montan wax"). Such alkyl acids are generally described as being of formula R—COOH, where R is an alkyl non-polar group which is lipophilic and can be from 18 to more than 200 carbons. An example of such a material is octacosanoic acid and its corresponding ester which is, for example, a di-ester of that acid with ethylene glycol. The COOH group forms hydrophilic polar salts in the presence of alkali metals such as sodium or potassium in the emulsion. While the alkyl portion of the molecule gets embedded within the paraffin, the acid portion is at the paraffin/aqueous medium interface, providing stability to the emulsion.

In some embodiments, the at least one wax component of the emulsion includes primarily and, preferably completely a slack wax component. In some embodiments, the at least one wax component is made up of a combination of paraffin wax and montan wax or of slack wax and montan wax. Although it should be understood that varying combinations of such waxes can be used. When using montan wax in combination with one or more of the other suitable wax components, it is preferred that montan be present in an amount of about 0.1% to about 10%, more preferably about 1% to about 4% by weight of the wax emulsion with the remaining wax or waxes present in amounts of from about 30% to about 50%, more preferably about 30% to about 35% by weight of the wax emulsion.

In some embodiments, the wax emulsion includes polyvinyl alcohol (PVOH) of any suitable grade which is at least partially hydrolyzed. The preferred polyvinyl alcohol is at least 80%, and more preferably at least 90%, and most preferably about 97-100% hydrolyzed polyvinyl acetate. Suitably, the polyvinyl alcohol is soluble in water at elevated temperatures of about 60° C. to about 95° C., but insoluble in cold water. The hydrolyzed polyvinyl alcohol is preferably included in the emulsion in an amount of up to about 5% by weight, preferably 0.1% to about 5% by weight of the emulsion, and most preferably about 2% to about 3% by weight of the wax emulsion.

In some embodiments, the stabilizer comprises a polymer that is capable of hydrogen bonding to the carboxylate or similar moieties at the water/paraffin interface. Polymers that fit the hydrogen-bonding requirement would have such groups as hydroxyl, amine, and/or thiol, amongst others, along the polymer chain. Reducing the polymer's affinity for water (and thus, its water solubility) could be achieved by inserting hydrophobic groups such as alkyl, alkoxy silanes, or alkyl halide groups into the polymer chain. The result may be a polymer such as ethylene-vinyl acetate-vinyl alcohol terpolymer (where the vinyl acetate has been substantially hydrolyzed). The vinyl acetate content may be between 0% to 15%. In some embodiments, the vinyl acetate content is between 0% and 3% of the terpolymer chain. The ethylene-vinyl alcohol-vinyl acetate terpolymer may be included in the emulsion in an amount of up to about 10.0% by weight, preferably 0.1% to about 5.0% by weight of the emulsion. In some embodiments, ethylene-vinyl alcohol-vinyl acetate terpolymer may be included in the emulsion in an amount of about 2% to about 3% by weight of the wax emulsion. An example ethylene-vinyl alcohol-vinyl acetate terpolymer that is available is the Exceval AQ4104™, available from Kuraray Chemical Company.

The wax emulsion may include a stabilizer material (e.g., PVOH, ethylene-vinyl alcohol-vinyl acetate terpolymer as described above). The stabilizer may be soluble in water at elevated temperatures similar to those disclosed with reference to PVOH (e.g., about 60° C. up to about 95° C.), but insoluble in cold water. The active species in the wax component (e.g., montan wax) may be the carboxylic acids and esters, which may comprise as much as 90% of the wax. These chemical groups may be converted into carboxylate moieties upon hydrolysis in a high pH environment (e.g., in an environment including aqueous KOH). The carboxylate moieties may act as a hydrophilic portion or "head" of the molecule. The hydrophilic portions can directly interface with the surrounding aqueous environment, while the rest of the molecule, which may be a lipophilic portion or "tail", may be embedded in the wax.

A stabilizer capable of hydrogen bonding to carboxylate moieties (e.g., PVOH or ethylene-vinyl alcohol-vinyl acetate terpolymer as described above) may be used in the wax emulsion. The polar nature of the carboxylate moiety may offer an optimal anchoring point for a stabilizer chain through hydrogen bonding. When stabilizer chains are firmly anchored to the carboxylate moieties as described above, the stabilizer may provide emulsion stabilization through steric hindrance. In embodiments where the wax emulsion is subsequently dispersed in a wallboard (e.g., gypsum board) system, all the water may be evaporated away during wallboard manufacture. The stabilizer may then function as a gate-keeper for repelling moisture. Decreasing the solubility of the stabilizer in water may improve the moisture resistance of the wax emulsion and the wallboard. For example, fully hydrolyzed PVOH may only dissolve in heated, and not cool, water. For another example, ethylene-vinyl alcohol-vinyl acetate terpolymer may be even less water soluble than PVOH. The ethylene repeating units may reduce the overall water solubility. Other stabilizer materials are also possible. For example, polymers with hydrogen bonding capability such as those containing specific functional groups, such as alcohols, amines, and thiols, may also be used. For another example, vinyl alcohol-vinyl acetate-silyl ether terpolymer can be used. An example vinyl alcohol-vinyl acetate-silyl ether terpolymer is Exceval R-2015, available from Kuraray Chemical Company. In some embodiments, combinations of stabilizers are used.

In some embodiments, the wax emulsion comprises a base. For example, the wax emulsion may comprise an alkali metal hydroxide, such as potassium hydroxide or other suitable metallic hydroxide, such as aluminum, barium, calcium, lithium, magnesium, sodium and/or zinc hydroxide. These materials may serve as saponifying agents. Non-metallic bases such as derivatives of ammonia as well as amines (e.g., diethanolamine or triethanolamine) can also be used. Combinations of the above-mentioned materials are also possible. If included in the wax emulsion, potassium hydroxide is preferably present in an amount of 0% to 1%, more preferably about 0.1% to about 0.5% by weight of the wax emulsion.

In some embodiments, an exemplary wax emulsion comprises: about 30% to about 60% by weight of water; about 0.1% to about 5% by weight of a lignosulfonic acid or a salt thereof; about 0% to about 1% by weight of potassium hydroxide; about 30% to about 50% by weight of wax selected from the group consisting of paraffin wax, slack wax and combinations thereof; and about 0.1% to about 10% montan wax, and about 0.1 to 5% by weight of ethylene-vinyl alcohol-vinyl acetate terpolymer.

The wax emulsion may further include other additives, including without limitation additional emulsifiers and stabilizers typically used in wax emulsions, flame retardants, lignocellulosic preserving agents, fungicides, insecticides, biocides, waxes, sizing agents, fillers, binders, additional adhesives and/or catalysts. Such additives are preferably present in minor amounts and are provided in amounts which will not materially affect the resulting composite board properties. Preferably no more than 30% by weight, more preferably no more than 10%, and most preferably no more than 5% by weight of such additives are present in the wax emulsion.

Shown in the below tables are example embodiments of a wax emulsion, although other quantities in weight percent may be used.

TABLE 2

| Raw Material | Quantity in Weight Percent |
| --- | --- |
| Water | 58 |
| Polyvinyl alcohol | 2.70 |
| Dispersant (Optional) | 1.50 |
| Paraffin Wax | 34.30 |
| Montan Wax | 3.50 |
| Biocide | 0.02 |

TABLE 3

| Raw Material | Quantity in Weight Percent |
| --- | --- |
| Water | 58.80 |
| Polyvinyl alcohol | 2.80 |
| Diethanol Amine | 0.04 |
| Paraffin Wax | 34.80 |
| Montan Wax | 3.50 |
| Biocide | 0.10 |

The wax emulsion may be prepared using any acceptable techniques known in the art or to be developed for formulating wax emulsions, for example, the wax(es) are preferably heated to a molten state and blended together (if blending is required). A hot aqueous solution is prepared which includes any additives such as emulsifiers, stabilizers, etc., ethylene-vinyl alcohol-vinyl acetate terpolymer (if present), potassium hydroxide (if present) and lignosulfonic acid or any salt thereof. The wax is then metered together with the aqueous solution in appropriate proportions through a colloid mill or similar apparatus to form a wax emulsion, which may then be cooled to ambient conditions if desired.

In some embodiments, the wax emulsion may be incorporated with or coated on various surfaces and substrates. For example, the wax emulsion may be mixed with gypsum to form a gypsum wallboard having improved moisture resistance properties. Some or all steps of the above method may be performed in open vessels. However, the homogenizer may use pressure in its application.

Advantageously in some embodiments, the emulsion, once formed, is cooled quickly. By cooling the emulsion quickly, agglomeration and coalescence of the wax particles may be avoided.

In some embodiments the wax mixture and the aqueous solution are combined in a pre-mix tank before they are pumped into the colloid mill or homogenizer. In other embodiments, the wax mixture and the aqueous solution may be combined for the first time in the colloid mill or homogenizer. When the wax mixture and the aqueous solution are combined in the colloid mill or homogenizer without first being combined in a pre-mix tank, the two mixtures may advantageously be combined under equivalent or nearly equivalent pressure or flow rate to ensure sufficient mixing.

In some embodiments, once melted, the wax emulsion is quickly combined with the aqueous solution. While not wishing to be bound by any theory, this expedited combination may beneficially prevent oxidation of the wax mixture.

Water-Resistant Products Comprising PCM Colloidally-Protected Wax-Based Microstructure Powders Embodiments of the disclosed wax-based colloidal dispersions can be used to form many different water-resistant products and as phase change material. For example, embodiments of powders made from wax emulsion disclosed above can be used an additive to form a water-resistant joint compound. The joint compound can be used to cover, smooth, or finish gaps in boards, such as joints between adjacent boards, screw holes, and nail holes. The joint compound can also be used for repairing surface defects on walls and applying texture to walls and ceilings amongst numerous other applications. The joint compound can also be specially formulated to serve as a cover coat on cement and concrete surfaces. The joint compound can be particularly useful in locations where there is high humidity, such as bathrooms, to prevent molding or other deleterious effects.

Also, embodiments of powders formed from wax emulsion described above can be incorporated into building materials such as asphalt (e.g., comprising a viscous liquid or semi-solid form of petroleum), concrete (e.g., comprising aggregate or filler, cement, water, various chemical and/or mineral admixtures, etc.), stucco, cement (e.g., formed from or comprising calcium carbonate, clay, gypsum, fly ash, ground granulated blast furnace slag, lime and/or other alkalis, air entertainers, retarders, and/or coloring agents) or other binders. In some embodiments, powders formed from the wax emulsion can be incorporated into concrete cover coat formulations, such as those used for filling, smoothing, and/or finishing interior concrete surfaces, drywall tape, bead embedment, skim coating, and texturing drywall. Further, embodiments of the wax emulsion can be incorporated into concrete and/or cement mixtures as a water repellent additive. Therefore, embodiments of the powders formed from wax emulsion can be incorporated into pourable concrete and/or cement that can be used, for example, for foundations in home constructions. Additionally, embodiments of the powders formed from wax emulsion can be used in cinder blocks as well as other similar concrete or cement based products.

Embodiments of the powders formed from wax emulsion can also be incorporated into boards, such as cement boards (e.g., a relatively thin board, comprising cement bonded particle boards and cement fiber (e.g., comprising cement, fillers, cellulose, mica, etc.), which may be 0.25-0.5 inch thick or which may be thicker or thinner), and/or cement board formulations. Therefore, the wax emulsion can be used to provide additional water resistance of the boards, and potentially prevent water or water vapor from penetrating the boards.

Additionally, powders formed from embodiments of the wax emulsion can be incorporated into paint and/or paint formulations (e.g. a liquid, liquefiable, or mastic composition that, after application to a substrate in a thin layer, converts to a solid film), such as paint that may be used to protect, color, or provide texture to a substrate. This can be done to impart water repellency, or water resistance, to the paint. The type of paint is not limiting, and embodiments of the wax emulsion can be incorporated into oil, water, acrylic, or latex based paints, including paints that may be pigmented to add color to the substrate on which the paint is applied. This water resistant paint can then be used on exterior and interior surfaces of buildings, as well as other products such as vehicles (e.g. cars, boats, and planes), toys, furniture.

While the above detailed description has shown, described, and pointed out features as applied to various embodiments, it will be understood that various omissions, substitutions, and changes in the form and details of the devices or algorithms illustrated can be made without departing from the spirit of the disclosure. For example, certain percentages and/or ratios of component ingredients have been described with respect to certain example embodiments; however, other percentages and ratios may be used. Certain process have been described, however other embodiments may include fewer or additional states. As will be recognized, certain embodiments of the inventions described herein can be embodied within a form that does not provide all of the advantages, features and benefits set forth herein, as some features can be used or practiced separately from others.

EXPERIMENTAL

Examples 1-7

Aqualite® 484 which is an emulsion from the Henry Company was spray dried to form particulate material from the emulsion. Aqualite® 484 emulsion was added directly to a 300-gallon mixing tank with moderate agitation. The solids content of the emulsion was also calculated. A solids result of 40.5% for the liquid was found. From the mixing tank, the emulsion was fed to the drying chamber of the spray drying equipment through a two-fluid internal mix spray nozzle. The second fluid used was air (at multiple pressures) to atomize the liquid into droplets. From the drying chamber, powder was conveyed to a baghouse system. Powder was collected directly from the baghouse and sifted through a 10-mesh screen to remove any oversized powder agglomerates from the final product. No inorganic flow agent was used during this trial. The product was packaged in drums. The weight of each drum was dependent on how often a dryer condition was changed. The powder samples were all tested for moisture content, particle size, and bulk density. Drying was performed at temperature between 115° F. and 140° F. (inlet) and 175° F. and 200° F. (outlet) and an atomization pressure of 120-130 psi. The melting point of the product is 140° F. The moisture content of the finished product was 1.26%. Particle size was measured for each test. The results are tabulated in Table 3. The D(10) particle size indicates the biggest average particle size that covers 10% of the material. D(50) indicates the average particle size below which 50% of the particles are found.

TABLE 3

| No. | Final Moisture Content %* | Particle Size D(10) | Particle Size D(50) | Particle Size D(90) | LBD/PBD |
|---|---|---|---|---|---|
| 1. | 1.26 | 37.03 | 93.28 | 307.60 | 0.28/0.31 |
| 2. | 0.78 | 39.58 | 109.90 | 367.50 | 0.29/0.32 |
| 3. | 0.69 | 46.01 | 150.80 | 533.70 | 0.30/0.35 |
| 4. | 0.68 | 116.40 | 333.70 | 884.40 | 0.30/0.33 |
| 5. | 2.37 | 80.00 | 264.40 | 660.90 | 0.31/0.35 |
| 6. | 0.38 | 59.32 | 172.60 | 441.10 | 0.26/0.29 |
| 7. | 0.45 | 60.91 | 168.00 | 497.10 | 0.31/0.34 |

*Initial moisture content was 40.5% solids

Figure 3:
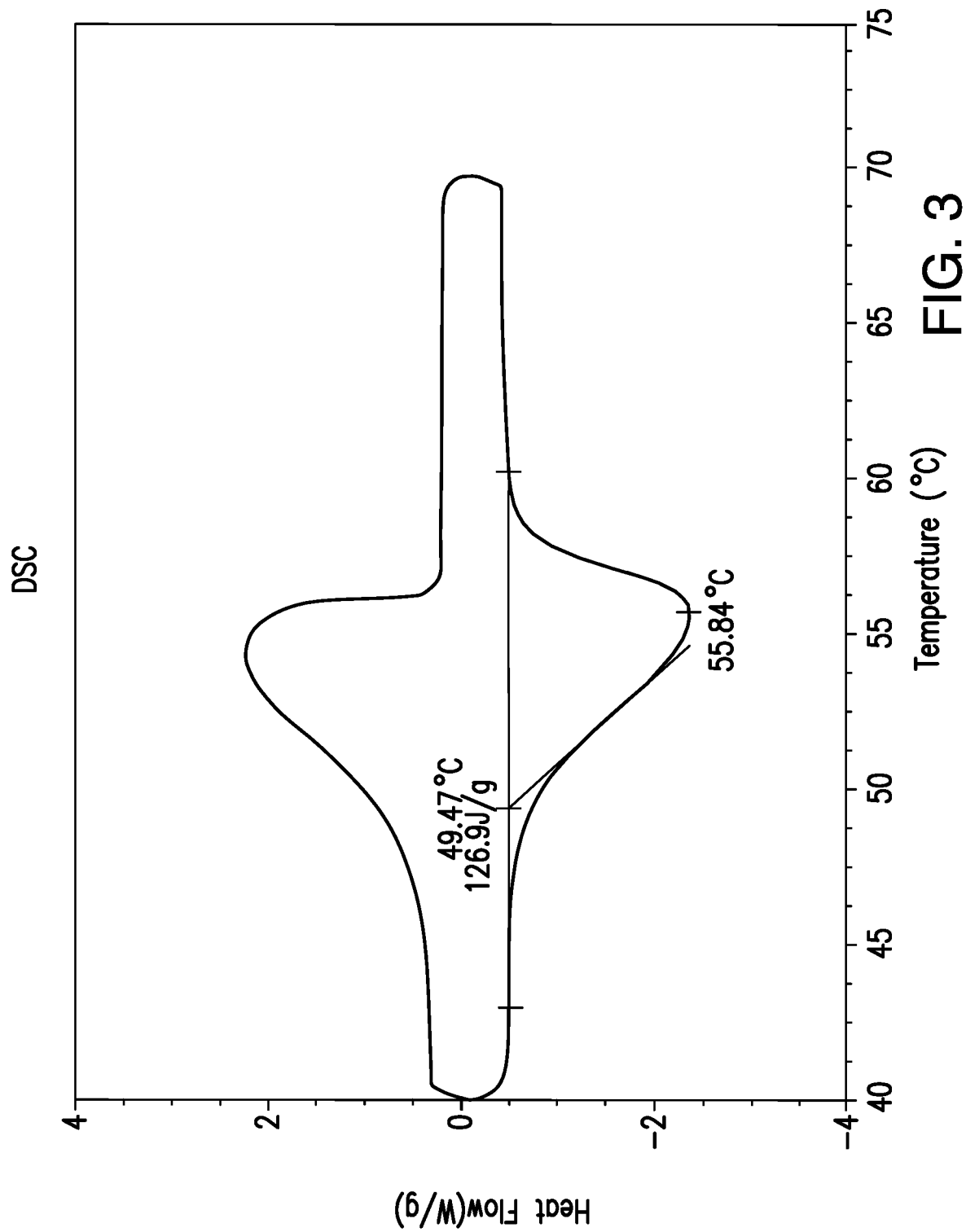
FIG. 3 relates to the DSC scan of a powder PCM material.
Figure 4:
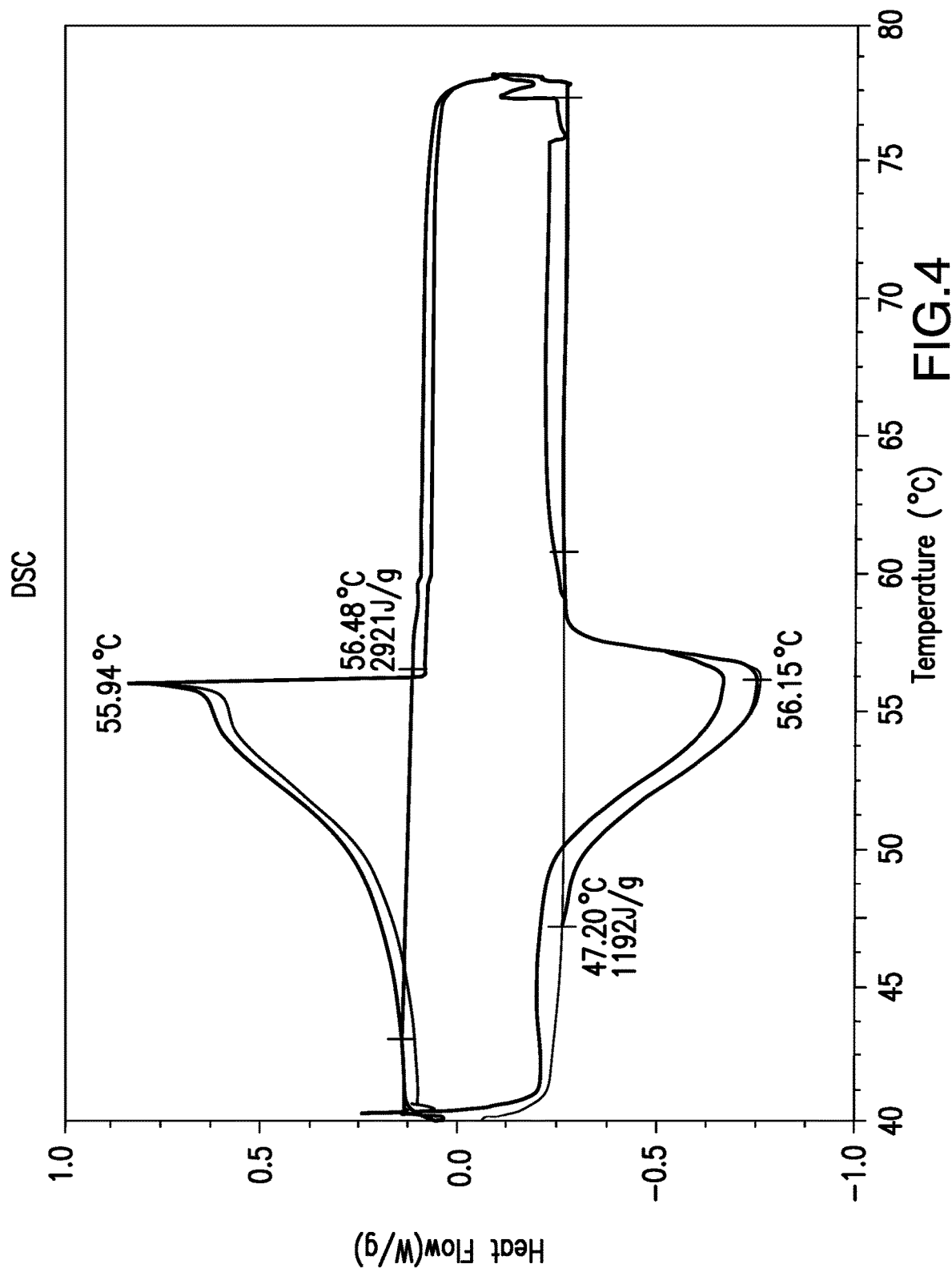
FIG. 4 relates to the DSC scan of a PCM material in calcium carbonate.
Figure 5:
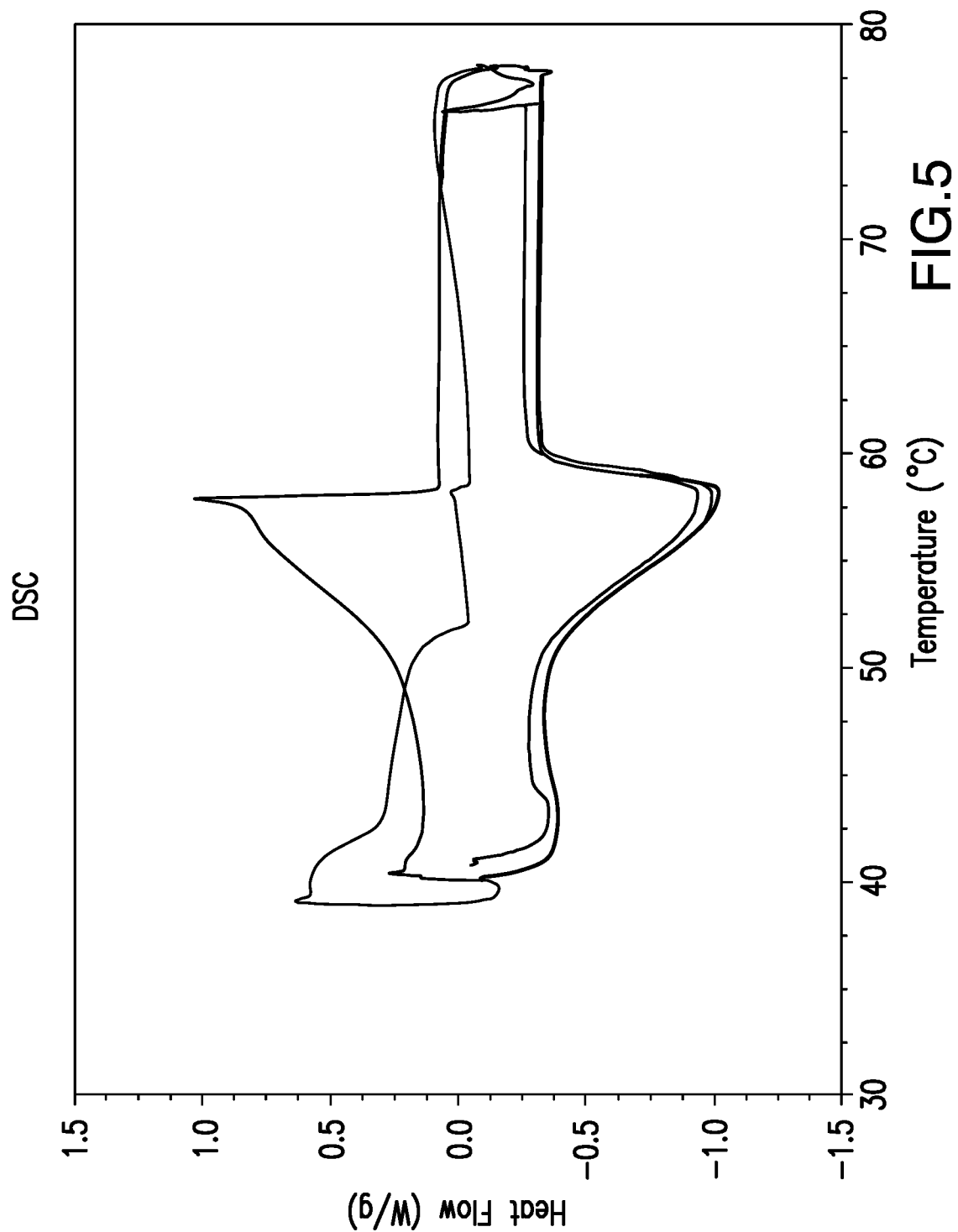
FIG. 5 relates to the DSC scan of the PCM material existing in an aqueous emulsion form.

FIG. 3 (AA AQ484-P Neat 100814-AA) is a DSC at a heating rate of 5° C./min of the neat powder wax emulsion (the one used in Examples 1-7 above). The paraffin used has a melting point of around 56° C. The latent heat of fusion is around 130 J/g. FIG. 4 shows a DSC plot (AA-082514-1) at a heating rate of 5° C./min of the same powder wax emulsion that was mixed with calcium carbonate (a ratio of 28% powder wax emulsion to 72% calcium carbonate). A cycle of heating and cooling was performed and repeated ten times. It was observed that other than the first cycle (removal of entrained air, etc.), all the other cycles were perfectly congruent, with minimal to no hysteresis. FIG. 5 shows a DSC of a coating formulation (WRP-061014-4AA) containing 30% wet dosage of the wax emulsion. This confirms that whether dry or wet, the wax emulsion acts as a phase change material. The repeat cycles showing the same thermal characteristics essentially shows that the materials could be used as phase change materials with a heat transition happening in the neighborhood of the melting point of the wax.

This invention also relates to those paraffins or waxes that are liquid at room temperature but have sub-zero melting points. While the emulsion would have colloidally-protected wax-based microstructures that have a solid shell and a liquid core, these materials could be used at sub-zero temperatures to maintain temperatures through a heating and a cooling cycle. For example, the $C_{12}$ hydrocarbon dodecane melts at −10° C. and the $C_{11}$ melts at −26° C. However, both are liquids at room temperature. One could use these materials to be emulsified with the polymeric materials mentioned previously to form the colloidally-protected wax alkane hydrocarbon structures, which can then be dried at lower temperatures or freeze dried to remove the water content and then powderized to now act as PCM materials at sub-zero temperatures. These materials would have applications in the medical field or even in the food applications where the temperatures need to be maintained at sub-zero but without major fluctuations. Clearly, these materials cannot be classified as waxes, but lower hydrocarbons. But these lower hydrocarbons can also be emulsified and then rendered into powders to sub-zero usage as PCM materials. Note that once the hydrocarbon alkane material, albeit in a liquid form, is trapped in the colloidally-protected form, when the water is removed, it will remain intact and not escape into the gaseous phase by evaporation (these are lighter fractions than waxes), colloidally protected by the secondary forces.

What is claimed:

1. A phase change material (PCM) comprising colloidally-protected wax based (CPWB) microstructures, wherein said CPWB microstructure comprises:
   (A) a wax core, and
   (B) said wax core being colloidally protected by polymer chains chemically bonded and thereby tethered to said wax core;
   wherein said wax core comprises a paraffin component and a non-paraffin component;
   wherein said paraffin component comprises at least one linear alkane wax defined by the general formula $C_nH_{2n+2}$, where "n" ranges from 14-34;
   wherein said non-paraffin component comprises at least one wax selected from the group consisting of animal-based wax, plant-based wax, mineral wax, synthetic wax, a wax containing organic acids and/or esters, anhydrides, an emulsifier containing a mixture of organic acids and/or esters, and combinations thereof;
   wherein said polymer chains comprise at least one polymer selected from the group consisting of polyvinyl alcohol and copolymers, cellulose ethers, polyethylene oxide, polyethyleneimines, polyvinylpyrrolidone, and copolymers, polyethylene glycol, polyacrylamides and poly (N-isopropylamides), pullulan, sodium alginate, gelatin, starches, and combinations thereof; and wherein said polymer chains do not form a shell-like physical casing.

2. The PCM as recited in claim 1, wherein a temperature operating range of said PCM is defined by the melting point of said paraffin component comprising at least one linear alkane wax defined by the general formula $C_nH_{2n+2}$, wherein "n" ranges from 14-34, and wherein said temperature operating range is characterized by the melting point of said at least one linear alkane wax at the pressure of the system in which said PCM is being used.

3. The PCM as recited in claim 2, wherein said temperature operating range of said PCM is from 6° C. to 140 C°.

4. The PCM as recited in claim 1, wherein "n" ranges from 17-18.

5. The PCM as recited in claim 1, wherein "n" is 17.

6. The PCM as recited in claim 1, wherein "n" is 18.

7. A matrix structure comprising PCM as recited in claim 1.

8. The matrix structure as recited in claim 7, wherein said PCM is in an aqueous emulsion form or a powder form.

9. The matrix structure as recited in claim 8, wherein the dry-solids weight percent of said PCM in said aqueous emulsion form, by weight of said matrix structure is in the range of from 10% to 50%; and wherein the solids weight content of the PCM in said dry powder form is in the range of from 1% to 50% by weight of said matrix structure.

10. The matrix structure as recited in claim 7, wherein said matrix structure is a construction wallboard.

11. The matrix structure as recited in claim 7, wherein said PCM in fine particle form is coated on a paper or a plastic sheet.

* * * * *